United States Patent [19]

Lamb, III

[11] Patent Number: 5,288,405
[45] Date of Patent: Feb. 22, 1994

[54] WASTEWATER TREATMENT WITH ENHANCED BIOLOGICAL PHOSPHORUS REMOVAL AND RELATED PURIFICATION PROCESSES

[75] Inventor: James C. Lamb, III, Charlottesville, Va.

[73] Assignee: Piedmont Olsen Hensley, Inc., Greenville, S.C.

[21] Appl. No.: 9,858

[22] Filed: Jan. 27, 1993

[51] Int. Cl.⁵ ............................................. C02F 3/30
[52] U.S. Cl. ..................... 210/605; 210/607; 210/625; 210/195.1; 210/195.3; 210/903; 210/906
[58] Field of Search ............... 210/605, 607, 621, 624, 210/625, 626, 630, 631, 903, 906, 195.1, 195.3, 202, 209, 259

[56] References Cited

U.S. PATENT DOCUMENTS

| Re. 32,429 | 6/1987 | Spector | 210/605 |
|---|---|---|---|
| 2,788,127 | 4/1957 | Davidson | 210/605 |
| 2,875,151 | 2/1959 | Davidson | 210/605 |
| 3,236,766 | 2/1966 | Levin | 210/605 |
| 3,654,147 | 4/1972 | Lenz | 210/625 |
| 3,994,802 | 11/1976 | Casey et al. | 210/605 |
| 4,162,153 | 7/1979 | Spector | 210/605 |
| 4,173,531 | 11/1979 | Matsch et al. | 210/625 |
| 4,257,897 | 3/1981 | Krichten et al. | 210/605 |
| 4,271,026 | 6/1981 | Chen et al. | 210/605 |
| 4,431,543 | 2/1984 | Matsuo et al. | 210/607 |
| 4,460,470 | 7/1984 | Reimann | 210/906 |
| 4,488,968 | 12/1984 | Hong et al. | 210/605 |
| 4,522,722 | 6/1985 | Nicholas | 210/605 |
| 4,874,519 | 10/1989 | Williamson | 210/605 |
| 4,999,111 | 3/1991 | Williamson | 210/605 |
| 5,022,993 | 6/1991 | Williamson | 210/605 |
| 5,098,572 | 3/1992 | Faup | 210/906 |
| 5,128,040 | 7/1992 | Moluf et al. | 210/625 |

OTHER PUBLICATIONS

"Pilot Studies of Biological Phosphorus Removal," James C. Lamb, III, et al., Nov. 1986.
"VIP Pilot Plant Program," Hampton Roads Sanitation District, Mar. 1987.
"Summary of Patented and Public Biological Phosphorus Removal Systems," William C. Boyle, U.S. Environmental Protection Agency, Aug. 1991.

Primary Examiner—Christopher Upton
Attorney, Agent, or Firm—Richard S. Faust

[57] ABSTRACT

A wastewater treatment system incorporates three interconnected, but separately controlled, processes to enhance biological phosphorus removal. The first process is a mainstream biological treatment process utilizing aerobic and solids separation zones and the provision of return activated sludge. The next is a first sidestream process for anoxic/anaerobic "selection" of desirable BPR organisms. Finally, a second sidestream process serves to ferment organic material in some of the return activated sludge to produce food utilized in the first sidestream selection process. The system permits the three processes to be separated from each other by creating two sidestreams, allowing all three processes to be controlled separately and optimized in satisfying their own specific goals.

20 Claims, 7 Drawing Sheets

WASTEWATER TREATMENT WITH ENHANCED BIOLOGICAL PHOSPHORUS REMOVAL AND RELATED PURIFICATION PROCESSES

FIELD OF INVENTION

The present invention relates generally to biological purification processes, such as wastewater treatment processes, wherein a constituent of an influent stream is removed. In illustrated embodiments, the invention relates primarily to a wastewater treatment system including sidestream processes operated under controlled flow and retention time conditions to enhance biological phosphorus removal.

BACKGROUND OF THE INVENTION

Phosphorus is a minor, but essential, constituent of cells produced during growth in biological systems. When living organisms are supplied with sources of energy, essential chemicals, and other appropriate environmental conditions, they extract small amounts of phosphorus from the water for use in their reproduction and metabolism. Subsequent removal of cells reduces amounts of phosphorus in the water and, therefore, provides a mechanism for reducing its nutrient content.

Some nutrient removal occurs in all biological wastewater treatment plants. The organisms use chemicals in the wastewater to satisfy their metabolic needs and to produce new growth. Because phosphorus is an essential constituent of that growth, some phosphorus is accumulated in solids that are removed from the system for separate treatment and disposal. Improved efficiency in biological removal of phosphorus requires that the processes be modified to enhance nutrient uptake by the organisms, or to improve removals through other mechanisms.

The efficiency of phosphorus removal in conventional biological wastewater treatment usually is poor, perhaps fifteen to thirty percent, because organic loadings are too low to produce enough growth to take up more phosphorus. Biological phosphorus removal (BPR) processes are based on creating conditions that enhance the amount of phosphorus taken u and stored by organisms, followed by their removal for separate disposal.

While all organisms use some phosphorus in their metabolism, some are capable, in the presence of dissolved oxygen or nitrates, of taking up and storing excess phosphorus as complex polyphosphates. Other organisms commonly found in activated sludge systems do not have this capability. The basic approach in designing and operating BPR systems is to create conditions that favor growth of the phosphorus-accumulating types of organisms. When they are removed from the system during sludge wasting, their higher phosphorus content enhances removal of the nutrient.

Under anaerobic conditions, the desired organisms can assimilate simple organic compounds, such as acetates, and satisfy their energy needs by decomposing stored polyphosphates and releasing soluble orthophosphates. According to a typical generic BPR process, return sludge and incoming wastewater are mixed without adding oxygen, producing "anaerobic" conditions, which is the absence of both oxygen and nitrates. Organisms that contain stored polyphosphates adsorb organics from the liquid and begin to assimilate them releasing orthophosphates. Other types of organisms in the system are handicapped here because they need oxygen or nitrates in their metabolic reactions. This gives the phosphorus-storing organisms the first opportunity to use the food and that advantage increases their population share in the system. In the jargon of biological treatment, this "selects" organisms that can remove more phosphorus.

Phosphorus concentration in the wastewater usually increases drastically because of the phosphorus release during the anaerobic phase of this process, to a level that may be several times higher than that in the incoming flow. Actual phosphorus removal occurs in the next step, where the wastewater and organisms are mixed and aerated, as in a conventional activated sludge process. In the presence of oxygen, the organisms take up and store the phosphorus that was released in the anaerobic phase, in addition to much or all of that which entered with the wastewater. Subsequent settling removes phosphorus from the wastewater as a sludge in which the organisms usually contain about four to six percent phosphorus, instead of the typical two to three percent in conventional activated sludge.

Return activated sludge from the settling tank is pumped back to the beginning of the process to provide a high population of organisms for treating the incoming wastewater, as in the conventional activated sludge process. This generic process is deceptively simple in appearance. Actually, it is affected by many variables, some of which are not thoroughly understood. However, it is known that the anaerobic step is absolutely critical to successful biological phosphorus removal. Its main function is to give an advantage to the types of organisms desired in the system but that occurs only if both dissolved oxygen and nitrates are absent during the period. Presence of either can interfere severely with BPR because the desired organisms could lose their advantage and might not be "selected" in adequate numbers.

Production and maintenance of anaerobic conditions require enough organics to generate sufficient oxygen demand to expend both dissolved oxygen and nitrates. Accordingly, BOD of the wastewater is important, with successful performance being favored by strong wastes. For that reason, some investigators stress the importance of having a sufficiently high BOD/P ratio in the wastewater being treated. However, other factors involved in the process make it infeasible to identify a single specific ratio that could assure success or failure in biological phosphorus removal.

Many systems have been proposed for utilizing the above phenomena to remove nutrients from municipal wastewater. The well-known A/0 and $A^2/0$ processes developed by Air Products and Chemicals, Inc. (USA) are mainstream BPR processes that expose mixed return activated sludge and wastewater to anaerobic conditions for BPR organism selection prior to discharge into the mainstream aerobic zone. The A/0 and $A^2/0$ processes lack desirable control over the BPR selection process because the anaerobic zone is directly in the mainstream where plant influent flow rates and conditions vary considerably. The A/0 and $A^2/0$ processes often may require chemical precipitation of phosphorus in order to bring phosphorus levels in the effluent to an acceptable level.

The Phostrip process of Biospherics, Inc. (USA) accomplishes the biological removal of phosphorus in the mainstream of the plant by passing a portion of the return activated sludge through an anaerobic "stripping tank." Sludge solids from the stripper are returned to the mainstream aerobic zone where they provide organisms for treating the mainstream. A liquid (supernatant) separated from the solids in the stripper is treated with lime to form a phosphate precipitate that is removed in a settler. Thus, in the Phostrip process biological phosphorus removal is supplemented by a sidestream chemical precipitating process.

More recently, a sidestream system for selection of the desirable BPR organisms was reported in "Pilot Studies of Biological Phosphorus Removal," James C. Lamb, III, et al., 1986. This so-called "UNC Process" sidestreams the entire return activated sludge flow to an anaerobic zone where desirable BPR organisms are selected. A fermenter serves to ferment primary sludge to supply the food used in the BPR selection process. Variations on the UNC process are described in U.S. Pat. Nos. 4,874,519; 4,999,111 and 5,022,993 issued to Orange Water & Sewer Authority of Carrboro, N.C.

While many processes have been proposed to utilize the phenomenon of uptake of phosphorus by BPR organisms, there is still a need to further improve the "selection" process for desirable BPR organisms so that a municipal wastewater treatment plant can operate within its wide range of influent flow and characteristics, while reliably removing phosphorus in the wastewater to desirable levels well below 1 mg/l.

SUMMARY OF THE INVENTION

The present invention provides a novel and versatile three-part process commercially suitable for enhancing biological phosphorus removal in wastewater treatment plants. More particularly, in accordance with the present invention, it is possible to obtain exceptionally low plant effluent phosphorus levels in the average range of 0.20-0.30 mg/l, well below most environmental regulations now in effect or currently envisioned. Broadly stated, according to the present invention, biological phosphorus removal in an activated sludge wastewater treatment system is enhanced by the utilization of three independently controlled processes as follows:

1) A mainstream activated sludge process that utilizes aeration and solids separation zones and return activated sludge to remove biochemical oxygen demand (BOD), phosphorus and suspended solids;

2) A first sidestream process for exposure of a portion of the return activated sludge under anoxic conditions to remove dissolved oxygen (D.O.) and nitrates ($NO_x$) followed by anaerobic conditions to allow "selection" of desired BPR organisms through assimilation of volatile acids and breakdown of stored complex phosphates; and 3) A second sidestream process for fermentation of organic materials to produce volatile acids and other substances for satisfying metabolic needs of the desired BPR organisms during the above selection process. These three processes are separated from each other by creating two sidestreams, allowing all three processes to be controlled separately and optimized in satisfying their own specific goals.

The first process, the mainstream activated sludge plant, removes BOD and suspended solids, as well as encouraging nitrification and aerobic uptake of phosphorus through the operation of desirable BPR and other appropriate organisms. The process is subject to substantial variations in flow and loadings as is any wastewater treatment plant. Usually it is able to cope with those variations and meet its goals principally because of calculated overdesign, as well as tolerance inherent in the types of processes underway. As will become clear as the description proceeds, the BPR organism selection processes are less tolerant of changes in environment for the organisms carrying them out.

The first sidestream process is established by directing a selected portion of the return activated sludge to an independently controlled sidestream situation where this portion of the return activated sludge first goes to an anoxic zone where D.O. and $NO_x$ are removed, followed by an anaerobic zone where desirable BPR organisms are selected.

By separating this first sidestream process from the mainstream, it becomes possible to have better control because flows and retention times can be varied at will or maintained constant, despite variations in water flows and character in the mainstream. In general, the first sidestream process should be controlled to optimize the selection of BPR organisms, through regulating the flow throughput and food supply. At the same time, the flow of return activated sludge that is not sidestreamed (i.e., the portion that goes directly from the solids separation zone back to the mainstream aerobic zone) can be varied to provide the supply of organisms needed in the activated sludge process, regardless of the amount of the sidestreamed return activated sludge that may be required to optimize the selection process. By providing the hydraulic retention time, and other conditions needed to optimize selection, the sidestream selection process can be accomplished with less tankage for return activated sludge than otherwise would be needed if the conditions were generated in the mainstream wastewater flow. Once established, the first sidestream process is much more stable than a process wherein BPR organism selection is accomplished in the mainstream because of lack of influence by variations in wastewater flow or character.

An important part of the "selection" process is the availability of volatile acids and other substrates that favor development of the desired BPR organisms. Some of these chemicals are produced in the anoxic and anaerobic phases of the first sidestream process, but their rate of production may be slow, requiring relatively long retention periods. Those would require large tankage and could be harmful to some of the other organisms desired in the mainstream treatment process. Also, conditions in the first sidestream process may not be optimal for production of the desired substrates because conditions required to optimize such substrate production may differ significantly from those that optimize BPR organism selection.

In accordance with the invention, a preferable approach is the provision of a second sidestream process which may be achieved by directing a variably controlled, modest flow of anaerobic return activated sludge diverted from the first sidestream through relatively long-term anaerobic fermentation for generation of the desired chemicals. In a preferred embodiment, the second sidestream includes multiple, serially connected fermentation cells. This process also may receive waste activated sludge or primary sludge or septage in addition to, or instead of, the mentioned flow from the first sidestream. The addition(s) can be thickened, if desired. The fermentation products of the second sidestream are returned to the anaerobic and/or anoxic phase of the first sidestream process to supplement those being produced there. The second sidestream process is designed and operated to optimize production of volatile acids and other fermentation products, requiring conditions different from those desired for the mainstream treatment process and first sidestream process.

Preferably, in utilizing the above described treatment system the three streams are operated in a "hierarchial" fashion; i.e., the flow through the mainstream includes the entire wastewater influent to the plant, the flow through the first sidestream is derived from, is a fraction of and is returned to the mainstream and the flow through the second sidestream is derived from, is a fraction of and is returned to the first sidestream. Thus, the mainstream may be viewed as the most important, and highest flow, stream of the overall system, with biological removal of BOD, suspended solids, phosphorus and other wastewater constituents occurring in the mainstream. The first sidestream may be viewed as the intermediate flow rate stream whose sole function is to assist the mainstream by selecting desirable organisms and delivering them for use in the mainstream. The second sidestream may be viewed as the lowest flow rate stream whose sole function is to assist the first sidestream by supplying "food" for the organism selection process. The unique function of each stream in this hierarchy is optimized by the proper selection of retention times and other operating parameters. Flow rates through the three streams are also important. While the flow rate through the mainstream cannot be fully controlled, in the two sidestreams the flow rates may be carefully chosen, maintained and changed at will. Thus, when desired, the two sidestreams can operate at essentially "steady state" conditions that optimize their performances and benefit the overall plant operation.

One significant advantage of the present invention is that the invention can be carried out utilizing conventional wastewater treatment equipment, tankage and control systems. Thus, in the case of a new plant installation, it is a relatively straightforward matter to design the plant to operate under the principles of the invention. In a "retrofit" to an existing plant, the necessary modifications to equipment and tankage are relatively minor and well within the skill of those familiar with wastewater treatment plant design and construction.

Another advantage of the invention is that the independent control and optimization of each of the three processes minimizes the effects of influent wastewater variations in flow and character. While the mainstream must be designed to accommodate these variations, the two sidestreams are insulated from the variations and can operate under controlled, "steady state" conditions. A related advantage is that the parameters of the sidestream processes can be adjusted at will to compensate for changes in temperature or other operating parameters.

Yet another advantage of the invention is that significantly less tankage is required for accommodating the return activated sludge than would be necessary for plant throughput. Even less tankage is needed when the sludge is thickened.

Another advantage relating to tankage is that the second sidestream process can be carried out in several small, covered tanks to minimize odor potential, while optimizing the fermentation process.

The above mentioned features and advantages of the invention are also broadly applicable to the removal of wastewater constituents other than phosphorus in the operation of a biological wastewater treatment system. In this regard, the invention may be defined as a biological wastewater treatment system that includes 1) a mainstream having a biological treatment zone for receiving an influent stream of wastewater, a downstream solids separation zone and means for returning sludge from the separation zone to the biological treatment zone, 2) a first sidestream system for organism selection with the first sidestream system being connected to the mainstream to establish a variably controlled inflow of sludge and with the first sidestream including an environmentally controllable zone receiving the inflow and operable at selected flow rates and retention times to optimize selection of the desired organisms and means for returning those desired organisms to the biological treatment zone and 3) a second sidestream system including an environmentally controllable cell receiving an inflow of liquor from the first sidestream for production of "food" therein to be utilized in the first sidestream selection process. According to this aspect of the invention, each of the three interconnected systems or processes are separated from each other so that each operates under its own selected flow rate and retention time conditions to achieve its unique goal in satisfying the overall wastewater treatment requirements of the plant.

Furthermore, the principles of the invention are also broadly applicable to biological purification systems in areas other than wastewater treatment wherein a constituent of an influent stream to be purified is removed. The invention, as broadly defined in this fashion, includes the same hierarchial principles discussed above to optimize the purification process.

BRIEF DESCRIPTION OF THE DRAWINGS

Some of the objects and advantages of the invention having been stated, others will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description that follows is to be understood as a broad, teaching disclosure directed to persons of skill in the appropriate arts, and not as limiting upon the present invention.

Figure 1:
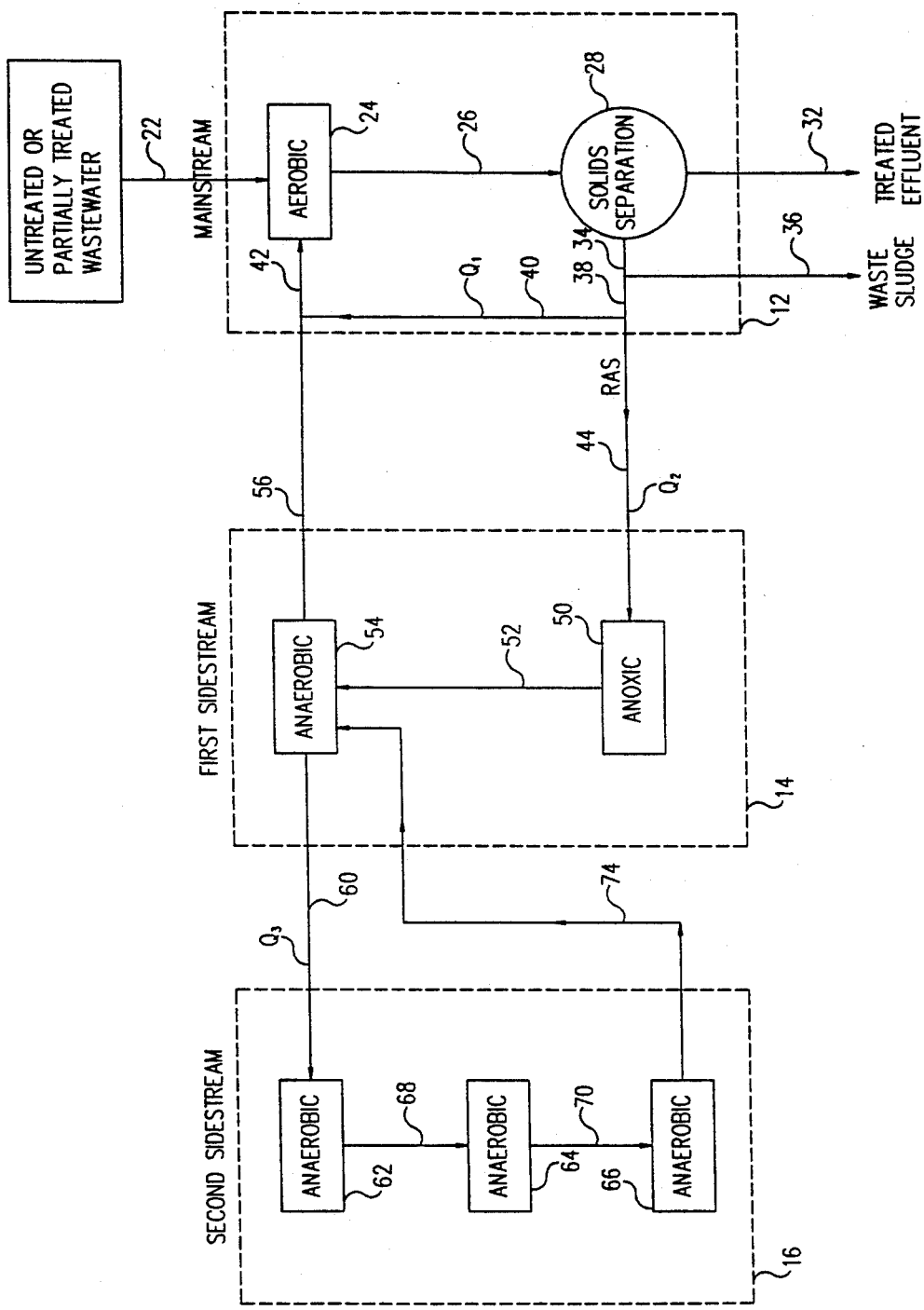
FIG. 1 is a schematic representation of a wastewater treatment system constructed and operated according to the principles of the present invention.

Referring to the drawings, and particularly to FIG. 1, there is shown a wastewater treatment system 10 that is constructed and operated in accordance with the principles of the present invention. System 10 includes the mainstream 12 of a conventional activated sludge wastewater plant, a first sidestream 14 and a second sidestream 16. The three streams are independently controlled to achieve their respective objectives. Mainstream 12 serves as the system for effecting biological removal of BOD, suspended solids and phosphorus from the influent wastewater stream. First sidestream 14 provides anoxic exposure of a portion of the return activated sludge to remove D.O. and $NO_x$ followed by anaerobic exposure to allow selection of desired BPR organisms. Second sidestream 16 provides fermentation of organic materials at relatively long retention times to produce volatile acids and other substrates that satisfy the metabolic needs of the desired BPR organisms as they are being selected in the first sidestream.

For illustrative purposes, the mainstream process 12 shows a conventional activated sludge wastewater treatment system, although it will be recognized that other types of biological treatment could be employed here instead. An influent line 22 delivers untreated or partially-treated wastewater to an aerobic zone 24, which serves as the principal zone for removal or modification of BOD, suspended solids, phosphorus, and other wastewater constituents through biological processes generally known and understood in the art. Aerobic zone 24 may take the form of one or more tanks constructed of concrete, for example, and may be equipped with facilities for addition of oxygen to the liquid through introduction of submerged bubbles or agitation of the liquid surface while it is in contact with air or other oxygen-containing gas. It will be appreciated that the aerobic zone may at times be less than fully aerobic due to fluctuations in the flow rate or character of the influent wastewater stream; however, it is intended to be predominantly aerobic at all times. Following a retention time usually on the order of about 5–24 hours in aerobic zone 24, the mainstream proceeds through line 26 to a settling or other type of solids separation zone 28. Treated effluent is removed via line 32 from the solids separation zone in the fashion well known in the art. Utilizing conventional sludge conveyance means, activated sludge is withdrawn from the solids separation zone through line 34 and is divided between a waste sludge line 36 and return activated sludge line 38. A first variably controlled portion $Q_1$ of the return activated sludge may be conveyed directly back to aerobic zone 24 via lines 40, 42 while a second portion $Q_2$ of the return activated sludge is diverted via line 44 to the first sidestream process 14. Activated sludge also may be supplied to the first sidestream process through addition of waste activated sludge, and either flow of activated sludge may be subjected to a thickening process for reduction of water content.

It will be appreciated that in a BPR process of the invention as described herein the provision of return activated sludge to the mainstream aerobic zone contemplates return directly to the aerobic zone or to a point in the mainstream that is upstream of the aerobic zone, for example, to an upstream anoxic or anaerobic zone that may be included in the mainstream for any of the purposes well known to those skilled in the art.

The terms "return activated sludge", "return sludge", or the like, are used herein in their conventional sense to mean a stream within a wastewater treatment plant, with the stream including a suspension of live microorganisms. Furthermore, the term "aerobic zone" is used herein in a broad sense to include a suspended growth zone as illustrated, or a zone that includes partially suspended growth and partially fixed growth (such as a rotating biological contactor) or other analogous biological treatment zones.

First sidestream 14 includes an anoxic zone 50 that is connected via line 52 to an anaerobic zone 54. Anoxic zone 50 receives a portion $Q_2$ of the return activated sludge via line 44, with the remaining portion $Q_1$ of the return activated sludge being delivered directly back to aerobic zone 24, as mentioned above. The anoxic zone 50 provides time without addition of oxygen to the flow during which D.O. and $NO_x$ are removed as a pretreatment before the sludge is conveyed into the anaerobic zone 54. This removal of D.O. and $NO_x$ can greatly enhance the efficiency of the BPR organism selection process in the subsequent anaerobic zone because it is accomplished through use of various types of food materials contained in the entering sludge flow. Food to enhance the reactions also could be added to the anoxic zone 50 from other sources, including untreated or partially-treated wastewater, primary sludge, septage, digester supernatant, or from sludge thickeners, as discussed in more detail below in connection with the description of FIG. 7. Thus, the role of anoxic zone 50 is to conserve volatile acids and other fermentation products for subsequent use by BPR organisms in the anaerobic environment and to maximize the number of those organisms produced. It is recognized that reactions occurring in zones 50 and 54 of the first sidestream process 14 could be carried out in a single reactor or in multiple reactors, as well as in the two shown for illustrative purposes in FIG. 1. The retention times in zones 50 and 54 may be selected within a relatively wide range according to many process variables; however, it has been found that a retention time on the order of about two hours in each zone 50, 54 is appropriate for many applications.

Anaerobic zone 54 serves generally to provide time under anaerobic conditions for selection of BPR organisms through assimilation of fermentation products produced in first sidestream process 14 and second sidestream process 16 to be discussed shortly. Access to certain volatile acids and other food materials in an anaerobic environment provides the BPR organisms with a competitive advantage because they are capable of assimilating those organics and obtaining energy needed in their metabolism by breaking down complex phosphates with release of simpler compounds. Subsequently, under aerobic conditions in zone 24, they can use oxygen and $NO_x$ as energy sources and take up phosphorus from solution for storage within their cells as complex phosphates. Other organisms in the activated sludge cannot carry out those types of reactions under the same environmental conditions, limiting their ability to compete for the food supply under the anaerobic conditions in zone 54. Thus the principal role of first sidestream process 14 is to increase the available population of organisms that are capable of accumulating excess phosphorus in their cells, thereby enhancing phosphorus removal under aerobic conditions in mainstream process 12. Conditions required to optimize production of BPR organisms in the first sidestream process 14 are very different from those required to optimize performance in mainstream process 12, in which the goals are to remove or modify BOD, suspended solids, phosphorus, ammonia, and other wastewater constituents. This need for different environmental conditions makes it advantageous to separate mainstream process 12 and sidestream process 14 into different zones, each of which can be designed and operated in ways that optimize its performance.

Following the BPR organism "selection" process in anaerobic zone 54, a BPR organism-rich liquor from zone 54 is conveyed via lines 56, 42 to aerobic zone 24 of the mainstream to supply the BPR organisms necessary to enhance phosphorus removal under aerobic conditions in the mainstream.

A relatively modest flow $Q_3$ of anaerobic mixed liquor is conveyed via line 60 from zone 54 to the second sidestream 16 which is separately controlled to produce food in the form of volatile acids and other substrates that satisfy the metabolic needs of the BPR organisms. Second sidestream 16 includes a fermentation zone which, in the illustrated embodiment, is defined by three serially connected anaerobic cells 62, 64, 66 that are connected by lines 68, 70. Because the flow $Q_3$ is relatively small, the anaerobic cells are also relatively small although the cells each operate at a retention time on the order of about twenty-four hours, producing a relatively long total retention time in the second sidestream on the order of about 2-4 days. Longer or shorter retention times may be used. Following a fermentation in all three anaerobic cells, food generated in the fermentation process is conveyed via line 74 to anaerobic zone 54 of the first sidestream where the food is utilized to enhance the selection of the desirable BPR organisms. Thus it is seen that the principal role of second sidestream process 16 is to produce food materials needed to enhance the growth of BPR organisms in first sidestream process 14. This is significantly different from the role of either first sidestream process 14 or mainstream process 12, which have been discussed above. It follows that optimizing performance of second sidestream process 16 is favored by design and operating conditions that differ substantially from those desired in either of the other two processes.

It will be appreciated that the input to the fermentation zone of the second sidestream typically includes fermentation organisms and organic chemicals that can be fermented by the organisms. These organisms and chemicals are sometimes referred to herein as "fermentation materials." In the embodiment illustrated in FIG. the fermentation materials are derived largely from the first sidestream. However, as discussed in more detail elsewhere, the fermentation materials may also be supplied from other sources.

Figure 2:
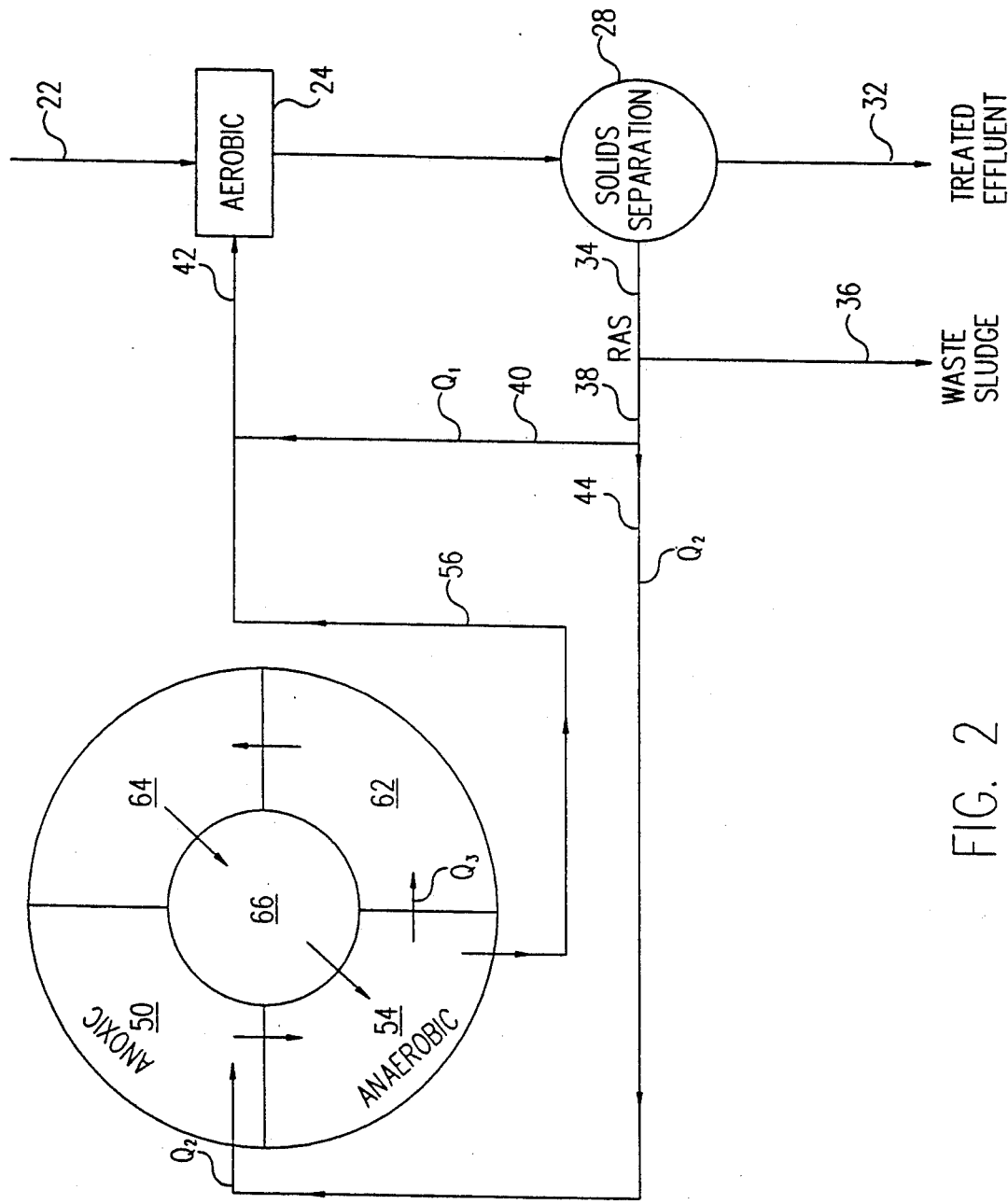
FIG. 2 is partly schematic drawing of the system of FIG. 1, but showing a top view of the first and second sidestreams as constructed from a modified trickling filter.

FIG. 2 illustrates how the concepts and flow patterns of FIG. 1 were implemented in an actual municipal wastewater treatment plant. The biological treatment system of the plant originally included a trickling filter in series with a conventional activated sludge system, followed by effluent settling ponds to remove fine suspended solids before discharge of plant effluent. The circular trickling filter was taken out of operation and modified by removing the stone media, subdividing the concrete tank into five compartments, installing mixers in each compartment and providing appropriate flow control valves and gates. This produced a facility in which sidestream processes 14 and 16 could be operated and separately controlled. During a period of several months, about 30% of the return activated sludge flow was routed directly back to the aerobic zone via lines 40 and 42 ($Q_1$). The remaining 70% of the return activated sludge $Q_2$ passed through line 44 to mixed anoxic cell 50 and thence through mixed anaerobic cell 54, from which it passed through lines 56 and 42 to the aerobic zones in the existing aerobic zone. A relatively small flow $Q_3$ was pumped continuously from anaerobic zone 54 into anaerobic fermentation cell 62 and flowed from there through fermentation cells 64 and 66 and back into anaerobic zone 54. Thus, the aerobic zone 24, solids separation zone 28, and return sludge flow $Q_1$ comprise the mainstream biological treatment process, as shown schematically (12) in FIG. 1. Anoxic and anaerobic cells 50 and 54, receiving $Q_2$, comprise the first sidestream process 14 of FIG. 1 and anaerobic fermentation cells 62, 64, and 66, receiving $Q_3$, comprise the second sidestream process 16 of FIG. 1.

The plant represented by FIGS. 1 and 2 has treated a municipal wastewater flow averaging 8.0 million gallons per day with remarkable results, including the reduction of phosphorus content of the wastewater to an average of about 0.25 mg/l during the first four months of operation. The details of operations of this plant over the four month period appear in Tables 1 and 2. As can be seen, the monthly average influent phosphorus concentration varied from 3.29 to 4.76 mg/l, with the maximum day in each month varying from 4.76 to 6.68 mg/l. The monthly average phosphorus content of treated effluent discharged from the plant varied from 0.20 to 0.29 mg/l, with the highest individual days in those months varying from 0.29 to 0.57 mg/l. It should be noted that during the four months no chemicals were added for phosphorus removal from the wastewater. This level of efficiency and consistency in phosphorus removal in a full-scale municipal treatment plant, using only biological treatment, is highly unusual. Performance of the plant with respect to removal of BOD, suspended solids, ammonia, and total Kjeldahl nitrogen was excellent and consistent.

Table 2 summarizes typical performance parameters for each of the three processes involved during the four month period.

TABLE 1

PERFORMANCE OF A MUNICIPAL TREATMENT PLANT DURING FIRST FOUR MONTHS AFTER STARTUP OF PROCESSES IN FIGS. 1 AND 2

| Quality Characteristics of Wastewater | Range of Monthly Average | Range of Maximum Day in Each Month |
|---|---|---|
| Plant Influent BOD, mg/l | 161–210 | 350–530 |
| Primary Effluent BOD, mg/l | 133–140 | 220–430 |

TABLE 1-continued
PERFORMANCE OF A MUNICIPAL TREATMENT PLANT DURING FIRST FOUR MONTHS AFTER STARTUP OF PROCESSES IN FIGS. 1 AND 2

| Quality Characteristics of Wastewater | Range of Monthly Average | Range of Maximum Day in Each Month |
|---|---|---|
| Plant Effluent BOD, mg/l | 2.6–4.0 | 4.3–8.0 |
| Influent Susp. Solids, mg/l | 274–362 | 470–1070 |
| Primary Effluent SS, mg/l | 76–152 | 155–490 |
| Plant Effluent SS, mg/l | 7–9 | 10–15 |
| Influent Total Phosphorus, mg/l | 3.29–4.76 | 4.76–6.68 |
| Primary Effluent Total Phos., mg/l | 2.63–4.17 | 3.19–11.70 |
| Plant Effluent Total Phos., mg/l | 0.20–0.29 | 0.29–0.57 |
| Plant Influent TKN, mg/l | 12–22 | 18–51 |
| Plant Effluent TKN, mg/l | 3.9–5.1 | 6.0–8.0 |
| Plant Influent Ammonia, mg/l | 10–13 | 15–17 |
| Plant Effluent Ammonia, mg/l | 1.0–1.4 | 1.6–2.5 |

TABLE 2
TYPICAL PERFORMANCE PARAMETERS FOR THE MUNICIPAL TREATMENT PLANT DURING FOUR MONTHS OF OPERATION

| Performance Parameter | Typical Value |
|---|---|
| MAINSTREAM PROCESS 12: | |
| Wastewater Flow, mil. gallons/day (mgd) | 8.0 |
| Total Return Activated Sludge Flow, mgd | 5.8 |
| Return Sludge Direct to Aeration, mgd | 1.8 |
| Return Sludge to Sidestream Process 14, mgd | 4.0 |
| Aeration Detention Time, hours | 7.6 |
| Temperature Range, degrees celsius | 21–33 |
| Mixed Liquor Suspended Solids (MLSS), mg/l | 4600 |
| Mixed Liquor Volatile Susp. Solids (MLVSS), mg/l | 3000 |
| F/M Ratio, lbs. BOD/day/lb MLVSS (Aeration only) | 0.15 |
| F/M Ratio, lbs. BOD/day/lb MLVSS (Aeration and Sidestream Process 14 combined) | 0.09 |
| Mean Cell Residence Time (MCRT), days (Aeration) | 13 |
| MCRT, days (Solids in Aeration and Sidestream 14) | 20 |
| SIDESTREAM PROCESS 14: | |
| Return Sludge Flow $Q_3$ Through Cells 50, 54, mgd | 4.0 |
| Hydraulic Detention Time in Cell 50, hours | 2.0 |
| Hydraulic Detention Time in Cell 54, hours | 2.0 |
| Suspended Solids Concentration, mg/l | 11,000 |
| SIDESTREAM PROCESS 16: | |
| Sludge Flow, $Q_3$, Cell 54 to Cell 62, mgd | 0.36 |
| Hydraulic Detention Time in Cell 62, hours | 22 |
| Hydraulic Detention Time in Cell 64, hours | 22 |
| Hydraulic Detention Time in Cell 66, hours | 22 |
| Suspended Solids Concentration, mg/l | 11,000 |

Figure 3:
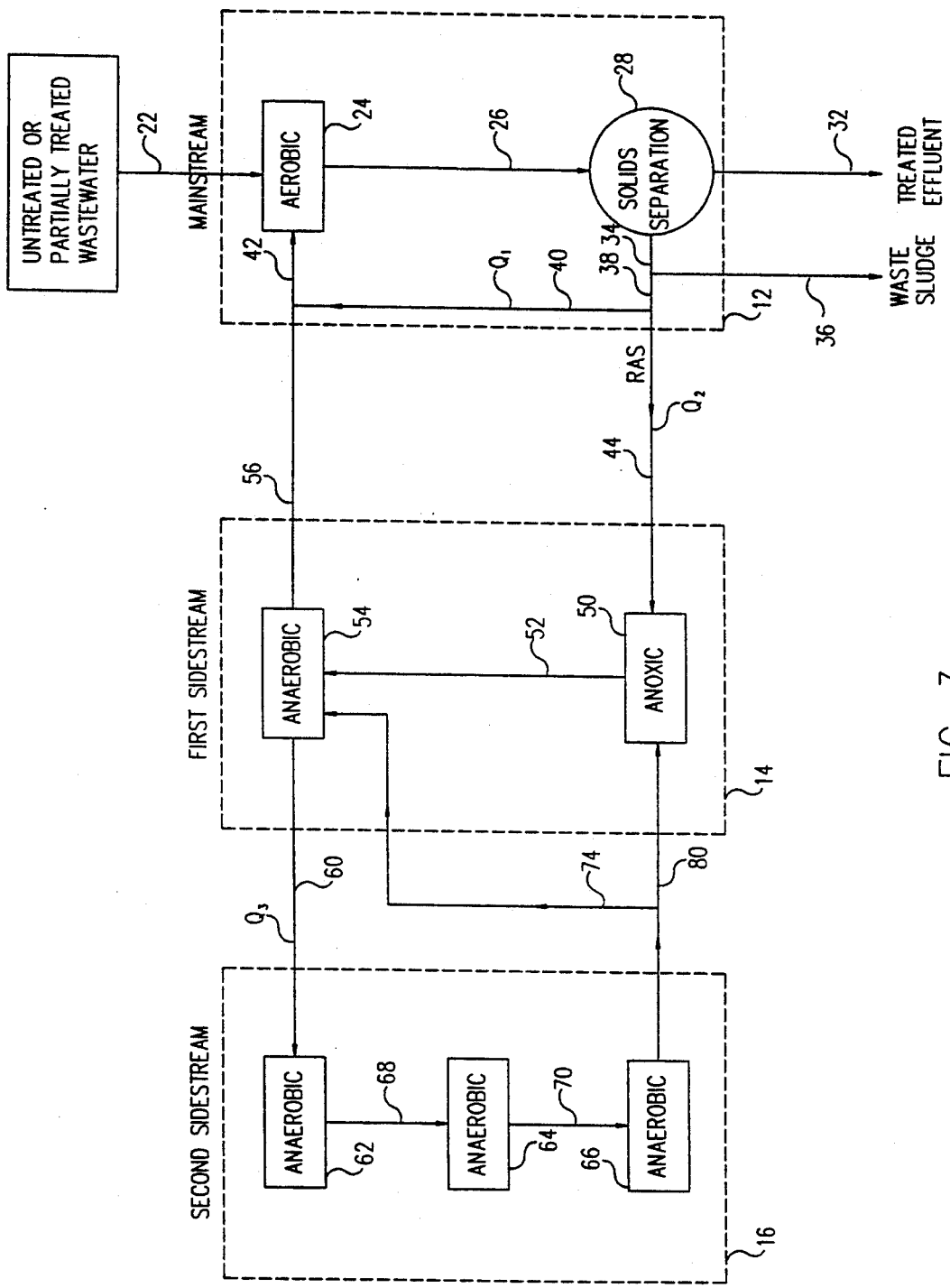
FIG. 3 is a schematic representation of an alternative embodiment in which the chemicals produced in the second sidestream fermentation are returned to both the anaerobic and anoxic zones of the first sidestream.

FIG. 3 illustrates a modified system in which the chemicals produced in second sidestream fermentation ar returned to both the anaerobic and anoxic zones of the first sidestream. To this end, the chemicals exiting anaerobic cell 66 are divided into a first flow in line 74 to the anaerobic zone 54 and a second flow in line 80 to the anoxic zone 50. This variation on the system may have the benefit of providing additional food materials for organisms in zone 50 to accelerate utilization of D.O. and $NO_x$ and attainment of anaerobic conditions. This may be used advantageously in situations where the return activated sludge contains high concentrations of D.O. and/or $NO_x$, or where it is desired to minimize the volume of anoxic zone 50. Use of fermentation products for this purpose in addition to supplying them in adequate quantities to zone 54 may make it desirable or necessary to increase their production in second sidestream process 16. That can be accomplished by increasing flow $Q_3$, increasing the total tankage in sidestream process 16, increasing sludge concentrations, or by other means that are outlined later.

Figure 4:
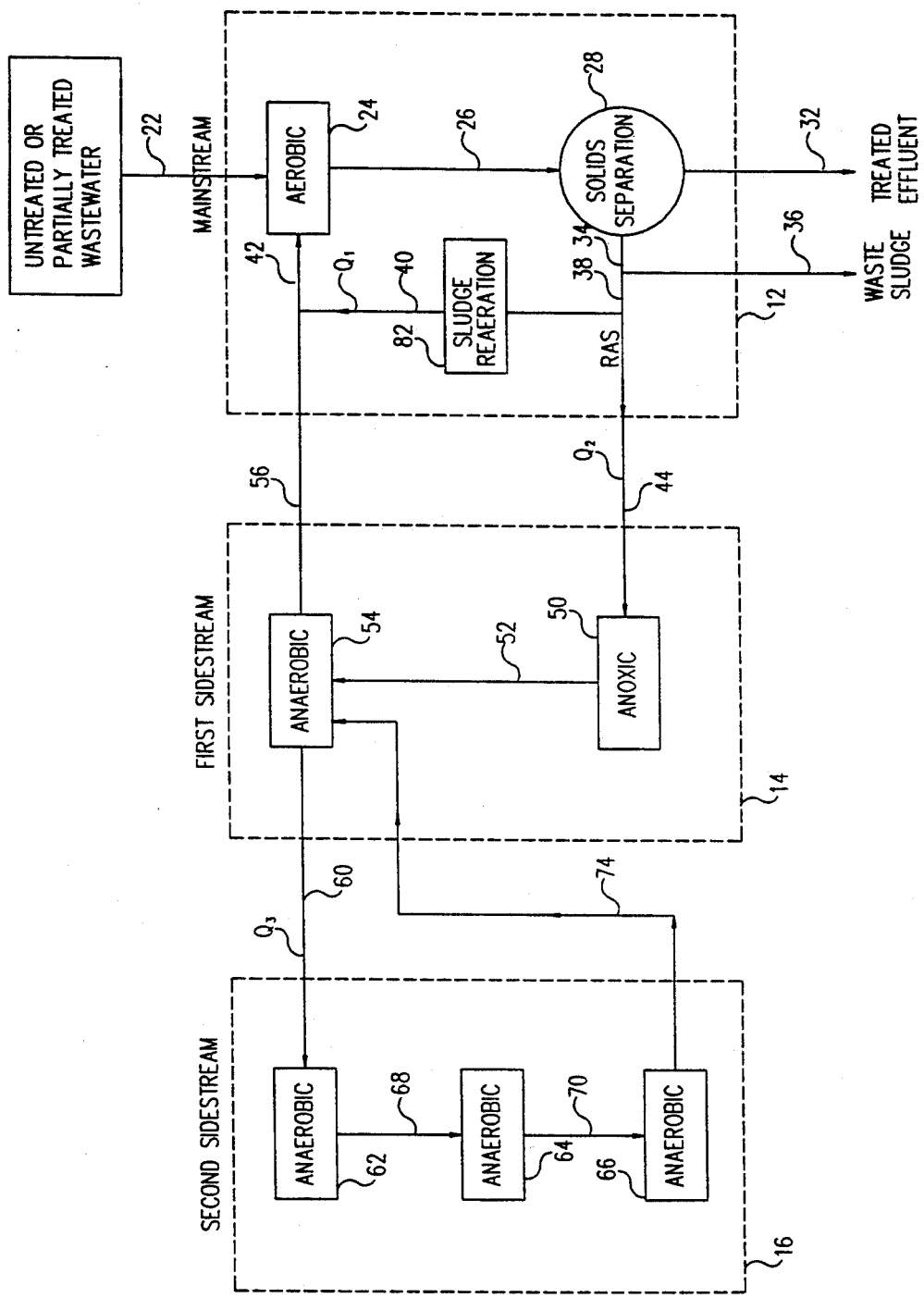
FIG. 4 is a schematic representation of another alternative embodiment in which a sludge reaeration system is used to aerate the portion of the return activated sludge that is returned directly to the mainstream aerobic zone, i.e., the portion that is not diverted to the first sidestream.

FIG. 4 illustrates a modification of the invention in which a sludge reaeration system 82 is used to aerate the portion $Q_1$ of the return activated sludge that is returned directly to the aerobic zone 24 via line 40. This variation on the system may have the benefit of providing effective mainstream treatment for some wastewaters with less aerobic tankage than would be necessary with conventional activated sludge. This modification is included to illustrate that the invention allows selection of whatever mainstream process 12 would be optimal for the wastewater in question, independent of the operating mode that might be best for the first or second sidestreams 14, 16.

Figure 5:
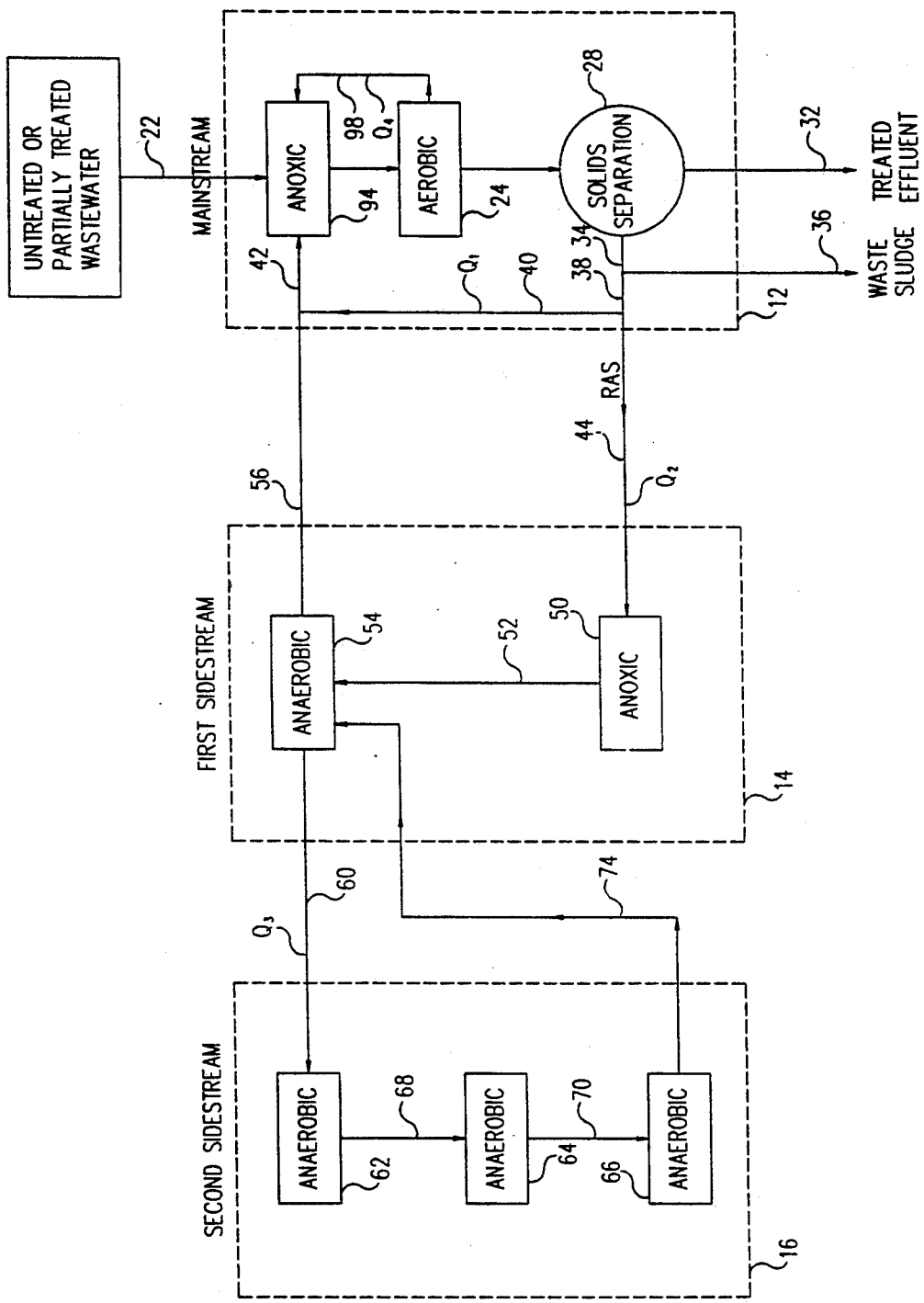
FIG. 5 is a schematic representation of an alternative embodiment in which the mainstream is provided with an anoxic zone to enhance nitrogen removal from the wastewater and with an internal recycle from the aerobic zone to the anoxic zone.

FIG. 5 is another illustration in which a different mainstream process may be adopted to satisfy special wastewater treatment requirements without affecting operations of sidestream processes 14 or 16. In this instance, the mainstream aerobic zone 24 is preceded by an anoxic zone 94. Mixture of internal recycle $Q_4$ carried via line 98 from aerobic zone 24 with incoming wastewater entering anoxic zone 94 via line 22 results in denitrification, which biologically decomposes nitrates formed in the aerobic zone. This removes nitrogen from the flow, in addition to BOD, suspended solids, phosphorus and other constituents. Both sidestreams remain unchanged, allowing efficient simultaneous removal of phosphorus, with each of the three processes being designed and operated to accomplish its separate goals. In similar fashion, many other biological processes, including different activated sludge modifications, some types of trickling filter systems, rotating biological contactors, and others could be adopted for mainstream treatment, depending on characteristics and needs of the wastewater. In this regard, while this specification refers primarily to "return activated sludge" systems, the invention is applicable to many, if not all, return sludge or recycle sludge systems, all of which will be referred to as return sludge systems.

Figure 6:
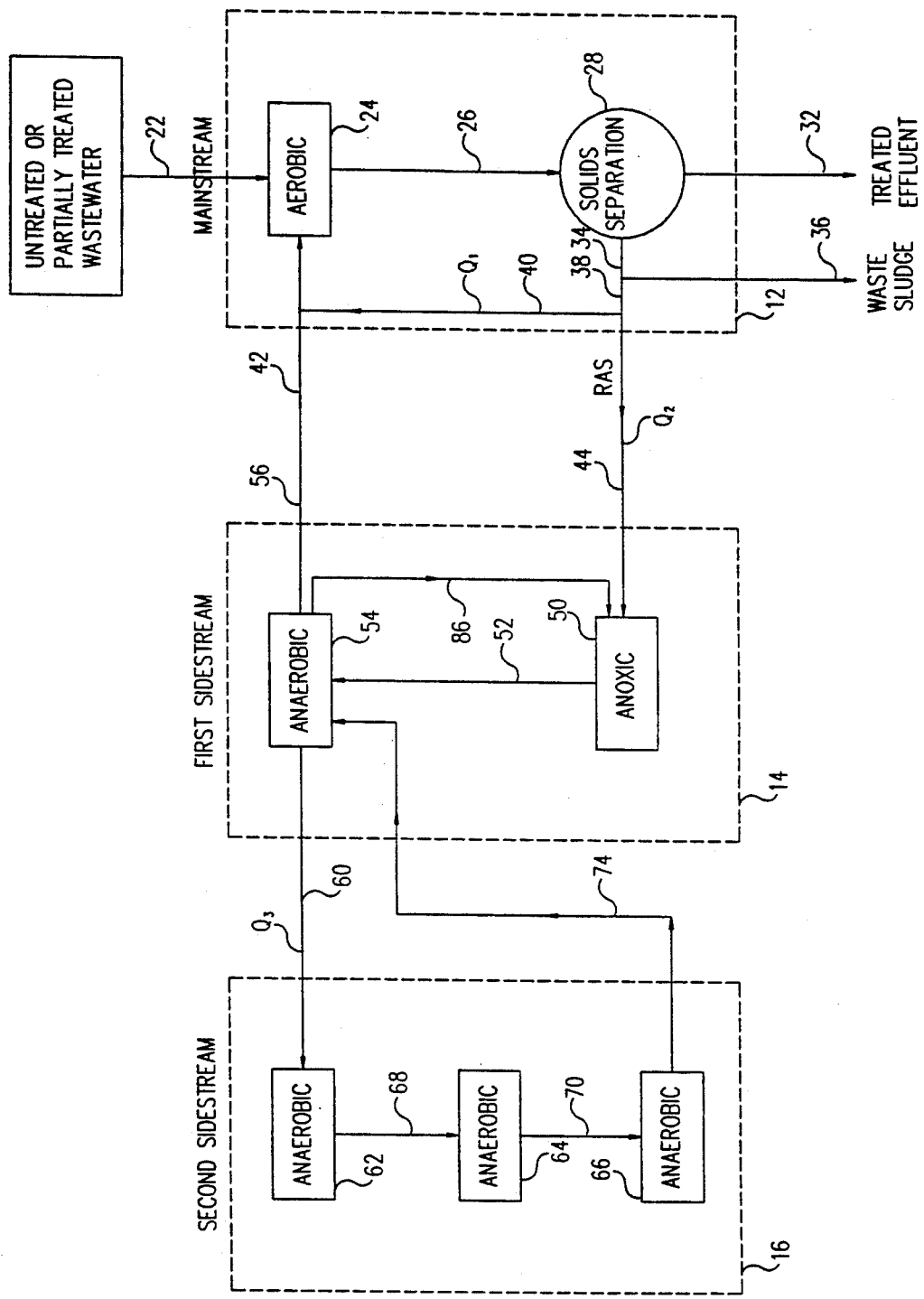
FIG. 6 is a schematic representation of yet another alternative embodiment in which the first sidestream is provided with its own return sludge system.

FIG. 6 illustrates a modification of the invention wherein the first sidestream 14 is provided with a recycle system for return of sludge via line 86 from anaerobic zone 54 to anoxic zone 50. This variation of the system has the benefit of providing "seed" organisms and food materials to enhance biochemical reactions underway in anoxic zone 50, and may be used advantageously to increase the rate or extent of production of BPR organisms, or to cope with situations in which there may be high concentrations of D.O. and/or $NO_x$ in the return activated sludge $Q_2$.

The beneficial effects discussed immediately above in connection with FIG. 6 may be enhanced even more by installing a sludge thickening unit within first sidestream 14 to further increase the active population of BPR organisms in the process. To this end, a sludge thickening unit (not shown) may be installed so that thickened recycle may be returned to anoxic zone 50, with the remaining flow from the thickener continuing into line 42. As a further alternative, a sludge thickening unit could be place in line 86 (FIG. 6) with the thickened flow directed to anoxic zone 50 and the thinner fraction returned to anaerobic zone 54.

The examples set forth immediately above serve to illustrate ways in which first sidestream 14 may be modified and controlled to improve its effectiveness in producing BPR organisms, independent of design and operating modes for mainstream process 12 or second sidestream process 16.

While not illustrated, it will be appreciated that the above modifications to first sidestream 14 also could be applied to second sidestream 16 in similar fashion. These modifications could include use of internal recycle, a thickening device, etc. with discharge of the thinner fraction containing the chemicals into anoxic zone 50 and/or anaerobic zone 54, and the thicker fraction being returned to fermentation cell 62 to increase the population of fermenters in sidestream 16. The benefits to sidestream 16 and the overall process include acceleration of the sidestream processes and increase in the production of volatile acids, minimizing tankage required and permitting independent control to optimize the process.

Figure 7:
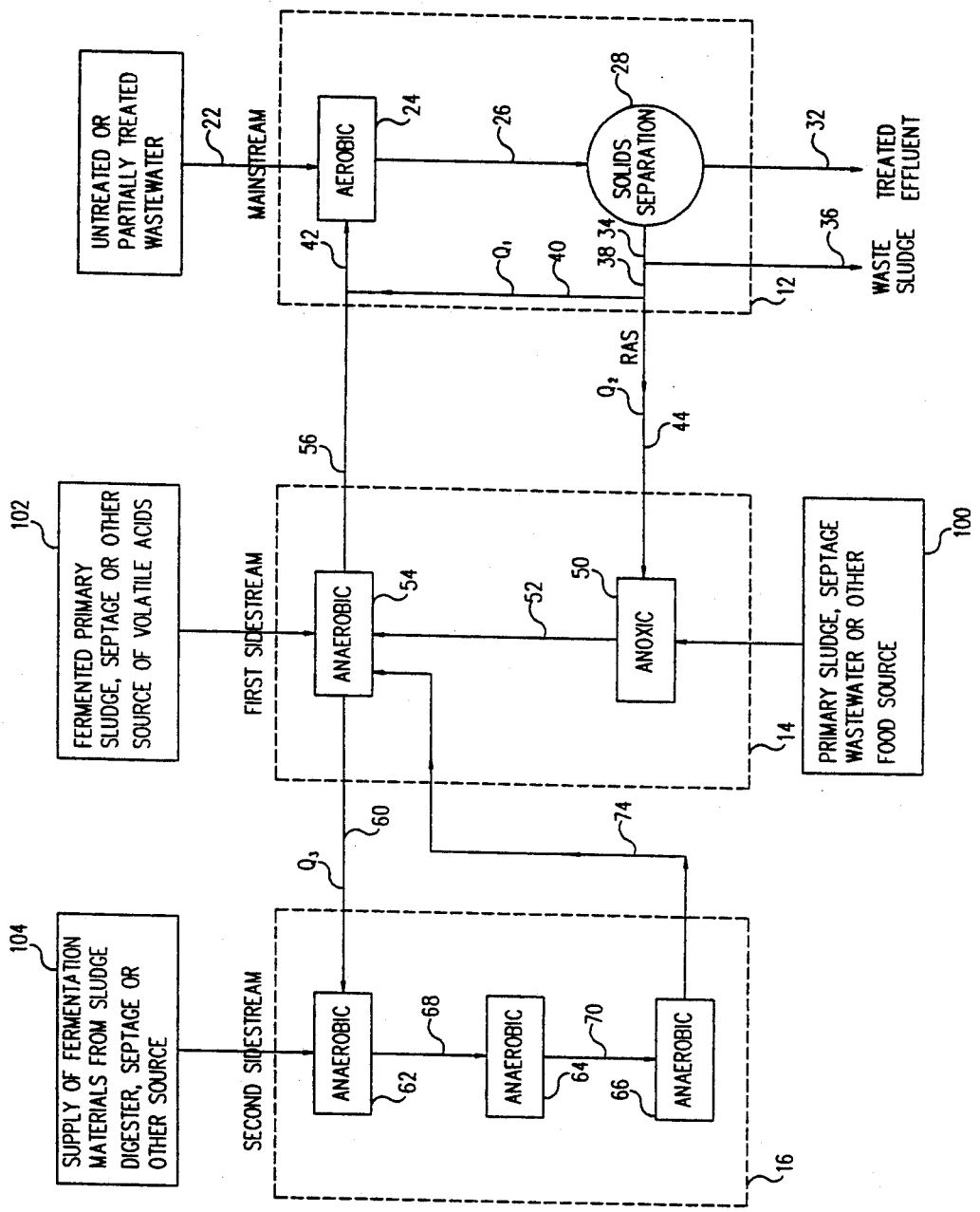
FIG. 7 illustrates several supplemental inputs to the general system described above including 1) an input of primary sludge, septage, wastewater, or other food source to the anoxic zone of the first sidestream, 2) an input of fermented primary sludge, septage, or other source of volatile acids to an anaerobic zone of the first sidestream and 3) an input of fermentation materials from a sludge digester, septage or other source to be input to the first anaerobic fermentation cell of the second sidestream process.

FIG. 7 illustrates three supplemental inputs to the general system of the present invention as generally described above. The first supplementary input 100 is primary sludge, wastewater, septage or other food source added to anoxic zone 50 of the first sidestream 14 to provide additional food materials to enhance removal of D.O. and $NO_x$ and make it possible to accomplish this goal with minimum requirements for tankage volume and time of exposure. This may be advantageously used in situations where the D.O. and/or $NO_x$ content of the return sludge $Q_2$ is high, or where available tankage is limited in volume.

A second supplementary input 102 is fermented primary sludge, septage or other source of volatile acids added to anaerobic zone 54 of the first sidestream for the purpose of supplementing the fermentation products produced in sidestream processes 14 and 16. This supplemental addition may be advantageously used in situations where weak wastewater or highly oxidized return sludge retard or limit production of volatile acids. Under some circumstances, such materials may be added to provide an excess of fermentation products as a safety factor in systems treating highly variable wastewaters.

The third supplementary input 104 is a supply of fermentation materials from a sludge digester, septage or other source which is added to anaerobic cell 62 of the second sidestream for insuring the presence of adequate supplies of proper food materials and organisms capable of metabolizing them to produce volatile acids and other products desired for use by the BPR organisms.

Additions of chemicals to the systems also may be undertaken to insure the presence of environmental conditions favorable to growth of desired organisms or inhibitory to competitive or otherwise undesirable organisms in any of the three processes. The environmental conditions that may be adjusted for those purposes could include provision of nutrients or trace elements required by the desired organisms, pH control, temperature, and others known to those familiar with the technology.

While the invention has been described in connection with specific embodiments and operating parameters, it will be appreciated that modifications may be made without departing from the true spirit and scope of the invention. For example, the invention has application to the removal of wastewater constituents other than phosphorus utilizing three separately controlled processes that interconnect in the same hierarchial fashion as described in detail above. The same principles of the invention may also be utilized in other biological purification systems wherein a constituent of an influent stream to be purified is removed by exposure of the stream to desirable organisms. These and other systems and processes are deemed to be within the scope of the present invention as defined by the appended claims.

That which is claimed is:

1. An activated sludge wastewater treatment system having three interconnected, but separately controlled, systems permitting selection of desired biological phosphorus removal (BPR) organisms under optimal conditions and efficient utilization of the BPR organisms to effect phosphorus removal from an influent wastewater stream, said system comprising:

a mainstream activated sludge system in which BOD, suspended solids and phosphorus are removed from the influent wastewater stream, said mainstream system including an aerobic zone for receiving an influent stream of untreated or partially treated wastewater, and a solids separation zone for separating treated system effluent from sludge, and means for conveying sludge from the solids separation zone to the aerobic zone as return activated sludge;

a first sidestream system in which desired BPR organisms are selected under optimal conditions, said first sidestream system being connected to said mainstream sludge conveying means to establish an inflow comprising a variably controlled portion of the return activated sludge, said first sidestream including an anoxic zone receiving the inflow for exposure of the sludge to remove D.O. and $NO_x$ and a downstream anaerobic zone to allow selection of desired BPR organisms through assimilation of volatile acids and breakdown of stored complex phosphates, and means for returning a BPR organism-rich liquor from the anaerobic zone of the first sidestream to the mainstream aerobic zone; and a second sidestream system in which food for the BPR organisms is produced, said second sidestream system comprising multiple, serially connected anaerobic fermentation cells, the first of said cells being connected to establish a variably controlled inflow of liquor from the first sidestream system for serial flow through the fermentation cells at selected flow rates and retention times to permit fermentation of organics to produce volatile acids and other substrates that satisfy the metabolic needs of desirable BPR organisms, and means for conveying the volatile acids and other substrates as BPR organism food to the first sidestream system.

2. The activated sludge wastewater treatment system of claim 1 wherein the anoxic and anaerobic zones of the first sidestream system are defined by multiple tanks.

3. The activated sludge wastewater treatment system of claim 1 wherein the second sidestream means for conveying the volatile acids and other substrates is connected to the first sidestream anaerobic zone.

4. The activated sludge wastewater treatment system of claim 1 wherein the second sidestream means for conveying the volatile acids and other substrates is connected to both the anaerobic and anoxic zones of the first sidestream.

5. The activated sludge wastewater treatment system of claim wherein at least one of said sidestream systems includes a downstream separator for separating out a portion of the solids for return to an upstream location within the sidestream.

6. The activated sludge wastewater treatment system of claim wherein at least one of said sidestream systems includes an internal recycle system.

7. The activated sludge wastewater treatment system of claim 1 including means for supplying a supplemental food source to the anoxic zone of the first sidestream.

8. The activated sludge wastewater treatment system of claim including means for supplying fermented primary sludge, septage or other source of volatile acids to the anaerobic zone of the first sidestream.

9. The activated sludge wastewater treatment system of claim 1 including means for delivering a supplemental supply of fermentation materials from a fermenter, septage, digester or other source to the second sidestream.

10. A biological wastewater treatment system having three interconnected, but separately controlled, systems permitting selection of desired organisms under optimal conditions and efficient utilization of the organisms to effect removal of wastewater constituents from an influent wastewater stream, said system comprising:

a mainstream biological treatment system including a biological treatment zone for receiving an influent stream of untreated or partially treated wastewater, a downstream solids separation zone for separating effluent from sludge, and means for returning sludge from the solids separation zone to the biological treatment zone as return sludge;

a first sidestream system in which organisms desired for removal of said constituents are selected under optimal conditions, said first sidestream system being connected to said mainstream sludge returning means to establish an inflow comprising a variably controlled potion of the return sludge, said first sidestream including at least one biological treatment zone receiving the inflow and operable at selected flow rates and retention times to provide means to optimize selection of desired organisms through assimilation of appropriate food materials, and means for returning desired organisms so selected in the first sidestream to the mainstream biological treatment zone; and a second sidestream system in which food needed for production of the desired organisms is produced, said second sidestream system comprising at least one biological treatment zone connected to establish a variably controlled inflow of liquor from the first sidestream system for flow through the cell under a selected flow rate and retention time conditions to provide means to encourage optimized biological production of organics that satisfy the metabolic needs of the desirable organisms, and means for conveying the organics so produced in the second sidestream to the first sidestream system.

11. A biological purification system wherein a constituent of an influent stream to be purified is removed by exposure of the stream to desirable organisms, said system having three interconnected, but separately controlled, systems permitting selection of desired organisms under optimal conditions and efficient utilization of the organisms to effect removal of the constituent from the influent stream, said system comprising:

a mainstream biological treatment system including a biological treatment zone for receiving the influent stream, a solids separation zone for separating effluent from sludge, and means for returning sludge from the solids separation zone to the biological treatment zone as return sludge;

a first sidestream system in which organisms desired for removal of the constituent are selected under optimal conditions, said first sidestream system being connected to said mainstream sludge returning means to establish an inflow comprising a variably controlled portion of the return sludge, said first sidestream including at least one biological treatment zone receiving the inflow and operable at selected flow rates and retention times to provide means to optimize selection of desired organisms through assimilation of appropriate food materials, and means for returning desired organisms so selected in the first sidestream to the mainstream biological treatment zone;

a second sidestream system in which food needed for production of the desired organisms is produced, said second sidestream system comprising at least one biological treatment zone connected to establish a variably controlled inflow of liquor from the first sidestream system for flow through the cell under selected flow rate and retention time conditions to provide means to encourage optimized biological production of organics that satisfy the metabolic needs of the desired organisms, and means for conveying the organics so produced in the second sidestream to the first sidestream system.

12. An activated sludge wastewater treatment process having three interconnected, but separately controlled, processes permitting selection of desired biological phosphorus removal (BPR) organisms under optimal conditions and efficient utilization of the BPR organisms to effect phosphorus removal from an influent wastewater stream, said wastewater treatment process comprising the steps of:

establishing a mainstream activated sludge wastewater treatment process of the type having an aerobic zone, a solids separation zone and the provision of return activated sludge to the aerobic zone;

directing a variably controlled portion of the return activated sludge to a first sidestream process where (1) D.O. and $NO_x$ are removed therefrom followed by (2) the selection of desirable BPR organisms through assimilation of volatile acids followed by (3) returning a BPR organism-rich liquor from the first sidestream process to the mainstream process;

establishing a second sidestream process by directing a variably controlled flow of sludge from the first sidestream to a fermentation zone where fermentation of organic materials occurs over a relatively long retention time to produce volatile acids and other substrates appropriate to satisfy the metabolic needs of the desirable BPR organisms, followed by conveying the volatile acids and other substrates so produced to the first sidestream process;

operating the three mentioned streams in a hierarchial fashion wherein the flow through the mainstream includes the entire wastewater influent to the plant, the flow through the first sidestream is derived from, is a fraction of and is returned to the mainstream and the flow through the second sidestream is derived from, is a fraction of and is returned to the first sidestream; and selecting the flow throughputs and retention times for the first and second sidestreams to create optimal conditions for achieving the unique goals of the respective sidestreams.

13. The activated sludge wastewater treatment process of claim 12 wherein the first sidestream process includes an anoxic zone followed by an anaerobic zone.

14. The activated sludge wastewater treatment process of claim 13 wherein the retention time in each of the anoxic and anaerobic zones of the first sidestream is on the order of about two hours.

15. The activated sludge wastewater treatment process of claim 12 wherein the step of fermentation in the second sidestream fermentation zone occurs in multiple, serially connected fermentation cells.

16. The activated sludge wastewater treatment process of claim 15 wherein the retention time in each fermentation cell is on the order of about 24 hours.

17. An activated sludge wastewater treatment process having three interconnected, but separately controlled, processes permitting selection and growth of desired biological phosphorus removal (BPR) organisms under optimal conditions and efficient utilization of the BPR organisms to effect phosphorus removal from an influent wastewater stream, said wastewater treatment process comprising the steps of:

establishing a mainstream activated sludge wastewater treatment process by (1) introducing untreated or partially-treated wastewater into an aerobic zone where the principal removal of BOD, suspended solids, phosphorus and other wastewater constituents occurs, (2) conveying the contents of the aerobic zone to a solids separation zone where solids separate out from the liquid, (3) removing treated effluent from the solids separation zone and (4) removing sludge from the solids separation zone for return to the aerobic zone as return activated sludge;

splitting the return activated sludge into two aerobic zone and directing the second flow ($Q_1$) to a first aerobic zone and directing the second flow ($Q_2$) to a first sidestream process;

establishing a first sidestream process by directing the second variably controlled portion ($Q_2$) of the return activated sludge to an anoxic zone where D.O. and $NO_x$ are removed followed by an anaerobic zone where desirable BPR organisms are selected through assimilation of volatile acids, followed by returning a BPR organism-rich liquor from the anaerobic zone to the mainstream process;

establishing a second sidestream process by directing a variably controlled flow ($Q_3$) of anaerobic mixed liquor from the first sidestream anaerobic zone to multiple, serially-connected fermentation cells where fermentation of organic materials occurs over a relatively long retention time to produce volatile acids and other substrates appropriate to satisfy the metabolic needs of the desirable BPR organisms, followed by conveying volatile acids and other substrates so produced in the second sidestream back to the first sidestream process.

18. The activated sludge wastewater treatment process of claim 17 wherein the mainstream, the first sidestream and the second sidestream define a hierarchally organized treatment process wherein the flow through the mainstream includes the entire wastewater influent to the plant, the first sidestream throughput ($Q_2$) is derived from, is a fraction of and is returned to the mainstream and the second sidestream throughput ($Q_3$) is derived from, is a fraction of and is returned to the first sidestream and wherein each of the sidestream processes is operated with selected flow rate and retention time values to create optimal conditions therein for achieving its unique goal.

19. The activated sludge wastewater treatment process of claim 17 wherein the retention time in the mainstream aerobic zone is on the order of about 5–24 hours, the retention time in each of the anoxic and anaerobic zones of the first sidestream process is on the order of about two hours and the total retention time in the second sidestream process is on the order of about 2–4 days.

20. An activated sludge wastewater treatment process having three separately controlled processes permitting selection and growth of desired biological phosphorus removal (BPR) organisms under optimal conditions and efficient utilization of the BPR organisms to effect phosphorus removal from an influent wastewater stream, said wastewater treatment process comprising the steps of:

establishing a mainstream activated sludge wastewater treatment process by (1) introducing untreated or partially-treated wastewater into an aerobic zone where the principal removal of BOD, suspended solids, phosphorus and other wastewater constituents occurs, (2) conveying the contents of the aerobic zone to a solids separation zone where solids separate out from the liquid, (3) removing treated effluent from the solids separation zone and (4) removing sludge from the solids separation zone for return to the aerobic zone as return activated sludge;

splitting the return activated sludge into two variably controlled flows and directing a first flow ($Q_1$) to the aerobic zone and directing the second flow ($Q_2$) to a first sidestream process;

establishing a first sidestream process by directing the second variably controlled portion ($Q_2$) of the return activated sludge to an anoxic zone where D.O. and $NO_x$ are removed followed by an anaerobic zone where desirable BPR organisms are selected through assimilation of volatile acids, followed by returning a BPR organism-rich liquor from the anaerobic zone to the mainstream process;

establishing a second sidestream process by directing a variably controlled flow of fermentation material to at least one fermentation cell where fermentation of organic materials occurs over a relatively long retention time to produce volatile acids and other substrates appropriate to satisfy the metabolic needs of the desirable BPR organisms, followed by conveying volatile acids and other substrates so produced in the second sidestream back to the anaerobic zone of the first sidestream process.

* * * * *